US012155219B2

(12) United States Patent
Cox

(10) Patent No.: US 12,155,219 B2
(45) Date of Patent: Nov. 26, 2024

(54) METHOD OF AND SYSTEM FOR POWER ISLAND DETECTION ON A POWER DISTRIBUTION NETWORK

(71) Applicant: Electricity North West Property Limited, Stockport (GB)

(72) Inventor: Steve Cox, Cheshire (GB)

(73) Assignee: Electricity North West Property Limited (GB)

( * ) Notice: Subject to any disclaimer, the term of this patent is extended or adjusted under 35 U.S.C. 154(b) by 557 days.

(21) Appl. No.: 17/285,862

(22) PCT Filed: Oct. 16, 2019

(86) PCT No.: PCT/EP2019/078061
§ 371 (c)(1),
(2) Date: Apr. 15, 2021

(87) PCT Pub. No.: WO2020/079065
PCT Pub. Date: Apr. 23, 2020

(65) Prior Publication Data
US 2021/0351593 A1   Nov. 11, 2021

(30) Foreign Application Priority Data
Oct. 18, 2018 (EP) ..................................... 18201133

(51) Int. Cl.
*H02J 3/38* (2006.01)
*H02J 13/00* (2006.01)
(52) U.S. Cl.
CPC .............. *H02J 3/388* (2020.01); *H02J 3/381* (2013.01); *H02J 13/00006* (2020.01); *H02J 13/00034* (2020.01)
(58) Field of Classification Search
CPC ................. H02J 3/388; H02J 13/00002; H02J 13/00034; H02J 13/00; H02J 3/0012;
(Continued)

(56) References Cited

U.S. PATENT DOCUMENTS 8,965,592 B2 * 2/2015 Manson ................. H02H 3/033
700/27
9,124,127 B2 * 9/2015 Timbus .................... H02J 9/06
(Continued)

FOREIGN PATENT DOCUMENTS

CN        103545919 B    5/2016
CN        106549414 A    3/2017
(Continued)

OTHER PUBLICATIONS

International Search Report and Written Opinion of the International Searching Authority for PCT/EP2019/078061, mailed Dec. 17, 2019 (Electricity North West Limited). Dec. 17, 2019.
(Continued)

*Primary Examiner* — Darrin D Dunn
(74) *Attorney, Agent, or Firm* — McAfee & Taft

(57) ABSTRACT

We provide a method of detecting a power island in a power distribution network of the type comprising: a plurality of distribution lines connecting consumers to electrical power supplied from one or more substations, a plurality of circuit breakers and/or switches each operable to connect and disconnect transmission of electrical power along an associated distribution line, each being associated with a communication device operable to communicate the status of the circuit breaker and/or switch to a monitoring system, and one or more embedded generators each connected to a distribution line within the power distribution network so as to provide electrical power to the power distribution network, the method including the steps of: storing at the monitoring system data representing the connectivity of the distribution network including a status of each circuit breaker and/or switch, receiving at the monitoring system a communication from a communication device that an associated circuit breaker and/or switch is disconnected, determining at the monitoring system, using the data representing
(Continued)

Figure 1:
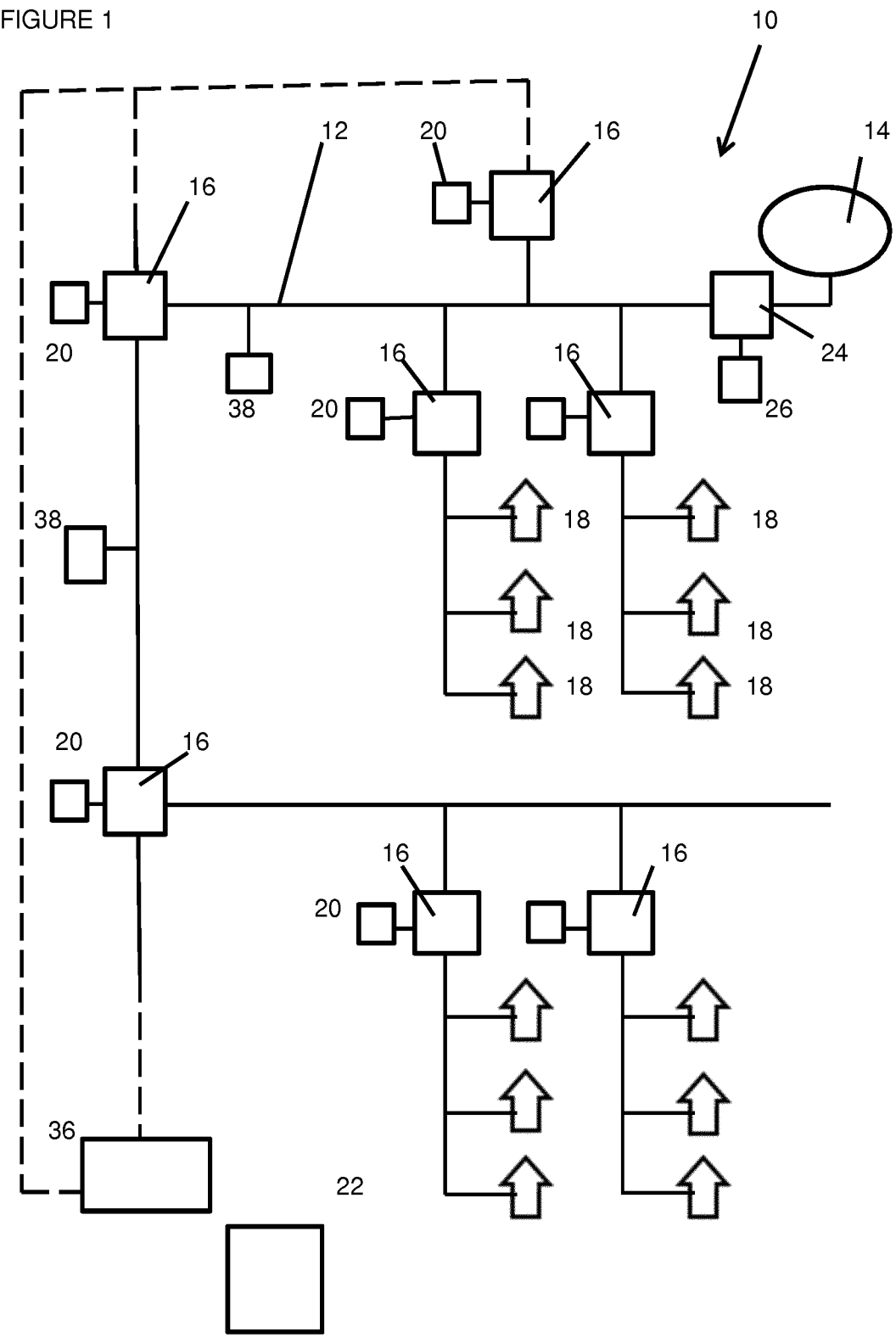

the connectivity of the distribution network, whether the disconnection of the circuit breaker and/or switch has resulted in a portion of the power distribution network being electrically disconnected from the remainder of the power distribution network that remains electrically connected to the one or more substations, and identifying the disconnected portion of the power distribution network as a power island within the power distribution network.

20 Claims, 3 Drawing Sheets

(58) Field of Classification Search
CPC ........ H02J 3/381; H02J 2203/10; H02J 3/001; H02J 2310/12; H02J 2310/60; H02J 13/0004; Y02B 70/3225; Y02B 90/20; Y02B 70/30; Y04S 10/30; Y04S 10/12; Y04S 10/18; Y04S 10/40; Y04S 10/52; Y04S 10/00; Y04S 20/221; G05B 19/042; G05B 15/02; G05B 19/0421; G05B 19/0428; G05B 19/406
See application file for complete search history.

(56) References Cited

U.S. PATENT DOCUMENTS

| | | | |
|---|---|---|---|
| 10,833,507 B2* | 11/2020 | Manson | ............ H02J 3/381 |
| 2013/0077367 A1* | 3/2013 | Zhu | ............ H02J 3/16 |
| | | | 323/205 |
| 2016/0013650 A1* | 1/2016 | Bhowmik | ............ H02J 3/381 |
| | | | 307/69 |
| 2017/0163029 A1* | 6/2017 | Hong | ............ H02H 7/262 |
| 2018/0054063 A1 | 2/2018 | Parashar et al. | |
| 2018/0095123 A1* | 4/2018 | Biswas | ............ H02J 13/00002 |
| 2018/0152022 A1* | 5/2018 | Manson | ............ G01R 31/50 |

FOREIGN PATENT DOCUMENTS

| | | |
|---|---|---|
| JP | 2005033851 A | 2/2005 |
| JP | 2014204465 A | 10/2014 |
| WO | WO 2012/032111 A2 | 3/2012 |

OTHER PUBLICATIONS

Search Report for European patent application No. EP 18201133 mailed Nov. 21, 2018 (Electricity North West Limited). Nov. 21, 2018.

Examination Report for UK patent application No. GB2105561.1 mailed May 10, 2021 (Electricity North West Limited) May 10, 2021.

Supplemental Search Report for European patent application No. EP 18201133 mailed Dec. 5, 2018 (Electricity North West Limited) Dec. 5, 2018.

Examination Report for European patent application No. EP 19784098.6 mailed Mar. 10, 2023 (Electricity North West Limited) Mar. 10, 2023.

* cited by examiner

METHOD OF AND SYSTEM FOR POWER ISLAND DETECTION ON A POWER DISTRIBUTION NETWORK

The present invention relates to a system for and a method of power island detection on a power distribution network.

Electricity distribution networks often contain significant amounts of embedded power generation. Embedded power generation (also known as distributed or dispersed power generation) is electricity generation capacity that is connected to the distribution network, rather than being connected to the transmission network.

Embedded generation includes many types of generator, including wind farms, solar plants, hydroelectric power plants, and combined heat and power plants, for example. Embedded generation also encompasses consumer power generation via generators installed in residential properties, such as by way of solar panels for example.

Where the amount of embedded generation in a portion of the network is closely matched to the demand in that portion of the network, then in the event of a network circuit fault, for example, that portion is effectively self-sufficient. If that portion of the network becomes detached from the surrounding synchronous electrical system, supply of power to customers in that portion can therefore be maintained by the embedded generation. In this event, this process can form a stable power island, in which the portion of the grid is disconnected from the remainder of the grid. This is usually disadvantageous, as an example, the frequency of the power supplied in that portion of the grid (the 'island') is not regulated by the surrounding system.

These power islands present safety risks to customers and network operators. For example, parts of the disconnected grid may lose their earth connection. For this reason it is necessary to detect any power island as soon as possible, and ensure that the embedded generation in that portion of the grid is promptly disconnected or otherwise shut down.

In some circumstances, if no safety issues are caused (i.e. if that portion of the grid is actively monitored and no risks are posed by current operating conditions) it may be desirable for the power island to be maintained so that power continues to be supplied to the customers within that portion of the grid, until it can be re-synchronised to the surrounding network.

The traditional method of detecting power islands, and to control the shutdown of the associated embedded generation, is by the use of electronic or electromechanical relays on or close to the circuit breakers or switches controlling each embedded generator. Amongst these relays are some that detect a rate of change of frequency (RoCoF) or that measure a vector shift (VS) at the generator. Power islands can be detected based on these measurements. For example, a rapid change in the frequency or a sudden shift in the phase of the voltages and or currents at the generator can be caused by the portion of the grid being disconnected from the rest of the distribution network.

When such conditions are detected, the relay opens each circuit breaker or switch connecting each respective embedded generator to the grid isolated portion of the grid (otherwise called an island). The progressive loss of generation power input to the power island causes a rapid and total loss of electrical power within the island. Once the generation has been shut down or disconnected, the power island is then re-energised from the surrounding synchronous network and both demand and generation reconnected.

This traditional technique relies on the detection of RoCoF or vector shift or other primary electrical parameters, to indicate that a power island has been formed. However, in the event that the amount of generation and demand are closely matched, there is a risk that these parameters will not change sufficiently to indicate that a power island has been formed. In that event, the relays may not reliably operate to disconnect the generators, and a stable power island can be formed, undetected by the RoCoF or VS relays.

The present invention seeks to address or ameliorate one or more of the problems associated with the prior art.

According to a first aspect of the invention we provide a method of detecting a power island in a power distribution network of the type comprising:

a plurality of distribution lines connecting consumers to electrical power supplied from one or more substations, a plurality of circuit breakers and/or switches each operable to connect and disconnect transmission of electrical power along an associated distribution line, each being associated with a communication device operable to communicate the status of the circuit breaker or switch to a monitoring system, and one or more embedded generators each connected to a distribution line within the power distribution network so as to provide electrical power to the power distribution network, the method including the steps of:

storing at the monitoring system data representing the connectivity of the distribution network including a status of each circuit breaker or switch, receiving at the monitoring system a communication from a communication device that an associated circuit breaker or switch is disconnected, and determining at the monitoring system, using the data representing the connectivity of the distribution network, whether the disconnection of the circuit breaker or switch has resulted in a portion of the power distribution network being electrically disconnected from the remainder of the power distribution network that remains electrically connected to the one or more substations, and identifying the disconnected portion of the power distribution network as a power island within the power distribution network.

The step of receiving a communication from a communication device that an associated circuit breaker or switch is disconnected may further include updating the stored data representing the connectivity of the distribution network to reflect that the distribution line associated with the circuit breaker or switch is electrically disconnected.

The method may, optionally, further include measuring an operating parameter of that portion of the power distribution network and comparing that measured parameter to a threshold, or comparing the rate of change of that parameter to a threshold to determine whether an operating fault has occurred in the portion of the power distribution network that has been determined to be a power island.

The operating parameter may be one of voltage, current, phase angle, or frequency of the electrical power provided to that portion of the network.

The method may further include the step of having determined that a power island has been formed, initiating a routine, e.g. a shutdown routine.

Measuring an operating parameter may include monitoring one or more of the operating parameters of that portion of the power distribution network by comparing the or each value to a threshold, or comparing the rate of change of that parameter to a threshold, and determining an operating fault when one or more of the operating parameters exceeds its associated threshold, in which following the detection of a power island, and in response to determining an operating fault, initiating a routine.

The routine may include disconnecting one or more embedded generators that are electrically connected to the portion of the power distribution network that has been determined to be a power island.

The routine may include the monitoring system communicating an error message to an operator, and in response to receiving an input from the operator, disconnecting one or more embedded generators that are electrically connected to the portion of the power distribution network that has been determined to be a power island.

Disconnecting the one or more embedded generators may include operating a relay or other control devices associated with the or each generator to disconnect it from its associated distribution line.

A plurality of embedded generators may be electrically connected to the power island, and disconnecting the embedded generators may include operating the relays associated with each of the plurality of embedded generators substantially simultaneously to disconnected them from the distribution lines of the power island, or operating the relays or other control devices associated with each of the plurality of embedded generators sequentially to disconnect them from the distribution lines of the power island.

According to a second aspect of the invention we provide a system for detecting a power island in a power distribution network of the type comprising:

a plurality of distribution lines connecting consumers to electrical power supplied from one or more substations, a plurality of circuit breakers and/or switches each operable to connect and disconnect transmission of electrical power along an associated distribution line, and one or more embedded generators each connected to a distribution line within the power distribution network so as to provide electrical power to the power distribution network, the system including a monitoring system configured to store data representing the connectivity of the power distribution network including a status of each circuit breaker or switch, and configured to receive communications indicating the status of the circuit breakers and/or switches, and a plurality of communication devices each associated with one or more circuit breakers and/or switches, the communication device being operable to communicate the status of its associated circuit breaker(s) or switch(es) to the monitoring system, the monitoring system being configured to determine, in response to receiving a communication indicating the disconnection of a circuit breaker or switch, using the data representing the connectivity of the distribution network, whether a portion of the power distribution network that has become electrically disconnected from the remainder of the power distribution network that remains electrically connected to the one or more substations, and to identify the disconnected portion of the power distribution network as a power island within the power distribution network.

The monitoring system may be configured to update the stored data representing the connectivity of the distribution network in response to receiving a communication from a communication device that an associated circuit breaker or switch is disconnected, to reflect that the distribution line associated with the circuit breaker or switch is electrically disconnected.

The system may further include a plurality of measuring devices each connected to a respective associated portion of the power distribution network, each being operable to measure an operating parameter of that associated portion of the power distribution network.

The operating parameter may be one of voltage, current, phase angle, or frequency of the electrical power provided to that portion of the network.

The system may be configured to monitor one or more measuring devices associated with the portion of the power distribution network identified as a power island, such that the operating parameter(s) is compared to a threshold or the rates of change of the operating parameter(s) is compared to a threshold, to determine whether an operating fault has occurred in the portion of the power distribution network that has been determined to be a power island.

The monitoring system may be configured to initiate a routine in response to a power island being identified.

The monitoring system may be configured to initiate a routine in response to determining that an operating fault has occurred in the portion of the power distribution network that has been determined to be a power island.

The monitoring system may be configured, in the event of the routine being initiated, to communicate to one or more embedded generators that are electrically connected to the portion of the power distribution network that has been determined to be a power island so as to cause those generators to disconnect from the power distribution network.

The system may further comprise an operator station providing an operator display and an input device, wherein the routine includes the monitoring system causing an error message to be displayed via the operator display, and in response to receiving an input from an operator via the input device, communicating to one or more embedded generators that are electrically connected to the portion of the power distribution network that has been determined to be a power island so as to cause those generators to disconnect from the power distribution network.

Each embedded generator may be connected to its respective distribution line via an associated relay, and wherein communicating to a generator includes communicating to one or more of the relays to cause disconnection of the associated embedded generators from the power distribution network.

According to a third aspect of the invention we provide a monitoring system providing a monitoring device having:

a memory, a processor, and a communication device configured to send and receive data, the monitoring device being configured:

to store in the memory data representing the connectivity of a power distribution network including a status of a plurality of circuit breakers and/or switches on the power distribution network, to determine, in response to receiving a communication indicating the disconnection of a circuit breaker or switch, using the data representing the connectivity of the distribution network, whether a portion of the power distribution network has become electrically disconnected a remainder of the power distribution network, and to identify the disconnected portion of the power distribution network as a power island within the power distribution network.

According to a fourth aspect of the invention we provide a computer program product comprising instructions which, when executed on a computer, cause the computer to carry out the steps of:

storing in a memory data representing the connectivity of a power distribution network including a status of a plurality of circuit breakers and/or switches on the power distribution network, determining, in response to receiving a communication indicating the disconnection of a circuit breaker or switch, using the data representing the connectivity of the distribution network, whether a portion of the power distribution network has become electrically disconnected from a remainder of the power distribution network, and identifying the disconnected portion of the power distribution network as a power island within the power distribution network.

Figure 2:
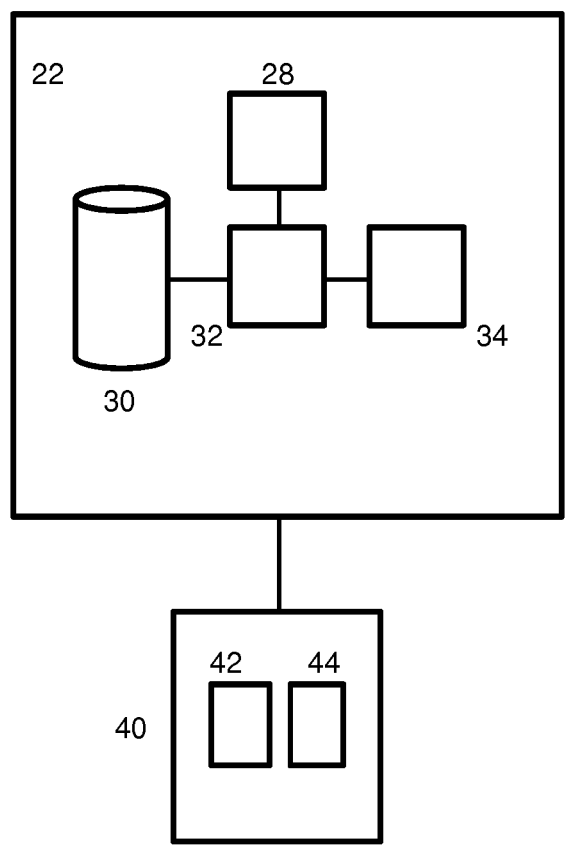
Figure 3:
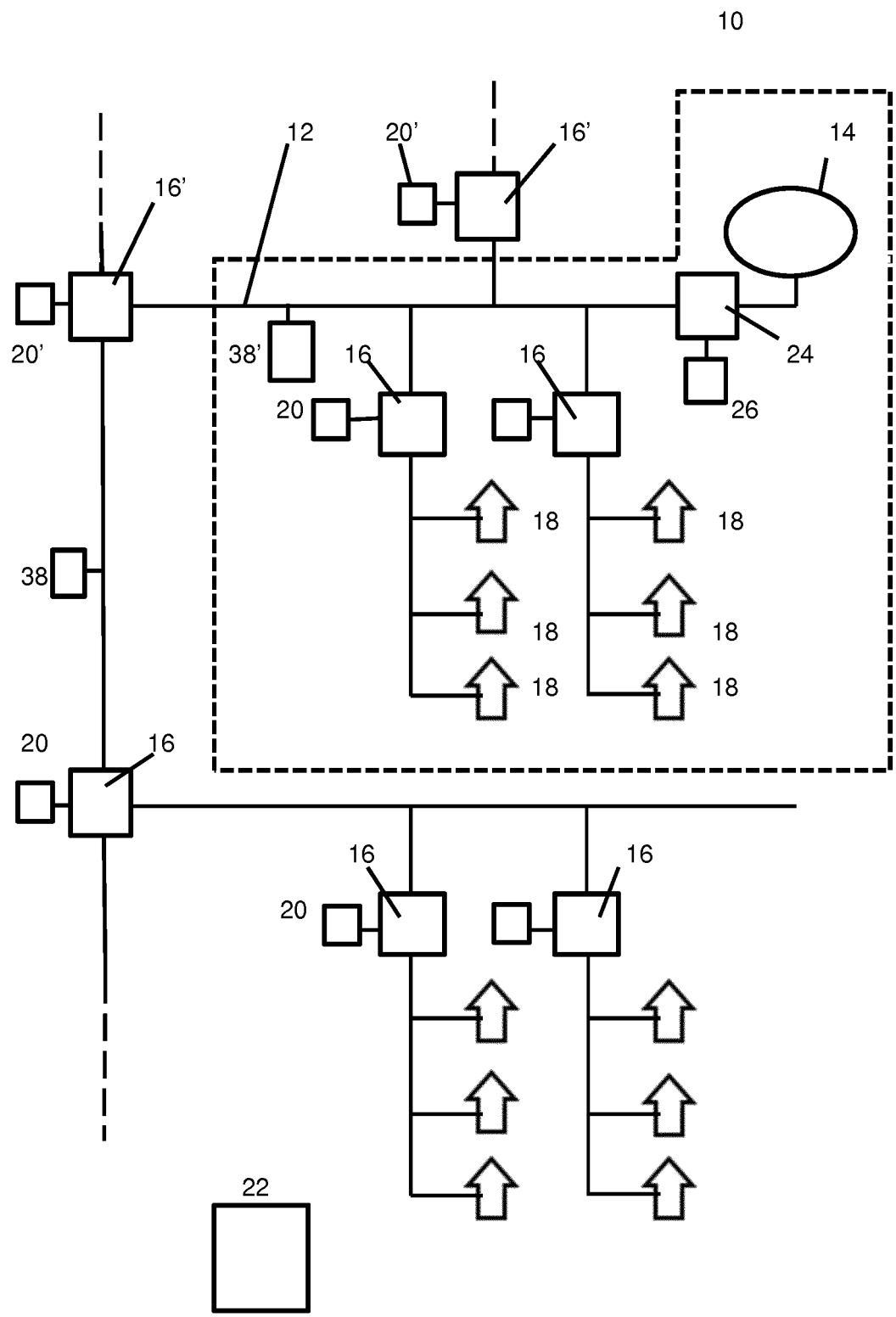

We now describe features of embodiments of the invention, by way of example only, with reference to the accompanying drawings of which FIG. 1 is a diagram of a portion of a power distribution network and associated monitoring system according to the invention, FIG. 2 is a diagram of a monitoring device according to embodiments of the invention, and FIG. 3 is a diagram of the portion of the power distribution network of FIG. 1, illustrating the presence of a power island within the network.

With reference to the drawings, we describe a monitoring system for detecting a power island in a power distribution network 10. A portion of the power distribution network 10 is shown in each of FIGS. 1 and 3. The power distribution network 10 is of the type that provides a plurality of distribution lines 12 (comprising suitable cabling as is known in the art, for example) connecting consumers 18 to electrical power supplied from one or more substations 36. Electrical power is generated at power plants or the like, and carried via transmission network to substations 36. The electrical power is stepped down from a high voltage (in the transmission network) to a relatively lower voltage, via a transformer at the substation 36. Electrical power is supplied to consumers 18 from the substations 36 through the distribution lines 12 at a lower voltage ready for consumption.

Consumers 18 of electrical power on a power distributions network 10 may include residential customers, commercial and industrial premises, or any other type of electrical power-consuming entity.

To enable faults in the network to be isolated, a plurality of switches or circuit breakers 16 are used to divide the power distribution network 10 into portions that can each be isolated from the rest of the distribution network 10 if required. Such circuit breakers 16 are needed to allow safe interruption of short-circuit currents caused in the network by multiple generating sources being connected to the network, for example.

Each circuit breaker 16 is operable to connect and disconnect transmission of electrical power along an associated distribution line 12. In normal operation the circuit breakers 16 are closed, allowing electrical power to pass via the distribution lines 12 to reach consumers. A fault in the electrical power distribution, such as an excessive current passing through the circuit breaker, may cause it to 'trip'— i.e. to disconnect the distribution line 12 so that electrical current no longer passes through it. The circuit breakers 16 may be of any suitable known type, providing a mechanism to detect a fault condition and a mechanism to disconnect the electrical power from passing through the distribution line 12.

The fault detected may be associated with a level of current exceeding a threshold, or may be associated with a high or low voltage (or phase angle) or frequency, or a rapid change being detected in current, voltage or frequency.

The power distribution network 10 includes one or more embedded generators 14 each connected to a distribution line 12 within the power distribution network 10 so as to provide electrical power to the power distribution network 10. In this way, electrical power is supplied to the distribution network not only via substations 36 (i.e. from the power transmission network) but also from electrical generators within the power distribution network 10 itself. Such embedded generators 14 may include wind farms, solar plants, hydroelectric power plants, and combined heat and power plants, for example. Embedded generators 14 may also be installed in residential or commercial properties, for example, by way of solar panels or wind-power generators, supplying additional electrical power to the network.

The status of the power distribution network 10 is carefully monitored via the use of various sensors, to detect the properties of the power distribution in various parts of the network. For example, the voltage, current and frequency are monitored closely, as are factors such as the phase of the voltage. Where a fault is detected, control systems (not shown) overseeing operation of the power distribution network 10 may act to disconnect one or more portions of the network, so as to isolate the cause of the fault (such as a malfunctioning or damaged piece of equipment). In other cases, a circuit breaker 16 may trip automatically in response to a fault occurring, to disconnect a distribution line 12 from the network.

Where one or more circuit breakers 16 have been opened, the power supplied from the substation(s) 36 to a portion of the network connected via the circuit breaker(s) 16 may be disconnected from the remainder of the network. For example FIG. 3 illustrates a portion of the network being disconnected from the remainder of the network following the disconnection of two circuit breakers 16'. Each circuit breaker 16' has an associated communication device 20' which communicates the disconnected state of the circuit breaker' to the monitoring device 22. The portion of the network disconnected from the remainder of the power distribution network is shown surrounded by a broken line. Within that portion, two groups of consumer properties 18 are connected via distribution lines 12 to an embedded generator 14. If the amount of embedded generation provided by that generator 14 closely matches the demand in that portion of the network from the consumers 18, that portion of the network may be effectively self-sufficient despite being disconnected from the substation(s) 36.

In most circumstances, the disconnection of that portion of the network would be detected by one or more of the sensors and control systems monitoring the network. However, if the portion of the network is balanced sufficiently, supply of power to consumers in that portion may be maintained by the embedded generator 14. This process forms a stable power island, in which the portion of the power distribution network is disconnected from the remainder of the power distribution network, and is therefore not monitored by the network-wide monitoring to which the rest of the network is subject.

To address this problem, a system is provided for detecting a power island in a power distribution network 10. The system provides a monitoring system typically comprising a monitoring device 22. The term monitoring device is intended to be restricted to a single device, but also includes one or more devices connected over a network for example. From herein the terms 'monitoring system' and 'monitoring device' are used interchangeably, each encompassing the inclusion of one or more devices. The monitoring device 22 is configured to store data representing the connectivity of the power distribution network 10 including a status of each circuit breaker 16, 16', and configured to receive communications indicating the status of the circuit breakers 16, 16'.

In embodiments of the invention, the monitoring device 22 comprises a storage device 30 for storing settings and operating parameters, or other operational or historic data, for example. The monitoring device 22 comprises a memory 28 and a processor 32, and a communications port 34 for sending and receiving communications.

Each switch or circuit breaker 16 is associated with a communication device 20. Typically, each circuit breaker 16 is associated with its own corresponding communication device 20 but conceivably multiple switches or circuit breakers 16 may be associated with a single communication device 20. The communication devices 20 are configured to send a communication to the monitoring device 22 of the monitoring system, when the status of the circuit breaker 16 changes. For example, when a circuit breaker 16 is tripped, to a disconnected state, a communication is sent from the associated communication device 20 to be received by the monitoring device 22, to indicate that the circuit breaker 16 status has changed.

The monitoring device 22 maintains data representing the connectivity of the distribution network 10. This data may be stored in its memory 28, or may be stored on the storage device 30. The data includes an indication of the status of each switch and/or circuit breaker 16 in the network, and may include data relating to the connections between power generators 14, substations 36, and the distribution lines 12 joining these elements. There are many forms the data representing connectivity may take. For example, the data may take the form of a graph representation comprising nodes corresponding to portions of the network comprising generators 14, substations 36 and consumers 18, joined by edges representing the distribution lines 12 and circuit breakers 16. Where a circuit breaker is disconnected the corresponding edge connecting adjacent nodes is removed or otherwise updated to reflect that no electrical connection is provided between those adjacent nodes of the graph. In this way, the connectivity of the graph itself can be made to represent the electrical connectivity of components on the power distribution network 10.

In response to receiving a communication indicating the disconnection of a circuit breaker 16, the monitoring device 22 may updated the stored data to reflect the change in connectivity. The monitoring device 22 uses the data representing the connectivity of the distribution network to determine whether a portion of the power distribution network 10 that has become electrically disconnected from the remainder of the power distribution network (i.e. the portion that remains electrically connected to the one or more substations 36). In doing so, the monitoring device 22 further also identifies the disconnected portion of the power distribution network 10 as a power island within the power distribution network 10.

The monitoring device 22 applies an algorithm to determine whether any portion of the power distribution network 10 is disconnected. By modelling the data representing the connectivity of the power distribution network 10 as a graph comprising edges and nodes, an algorithm can be used to establish whether the graph is a connected graph, and to identify a disconnected subgraph (using a breadth-first or depth-first search originating from a node adjacent the disconnected circuit-breaker, for example, or by another suitable algorithm as is known in the art).

In embodiments, the power distribution network 10 may include a plurality of measuring devices 38 each connected to a respective associated portion of the power distribution network 10 (i.e. to a distribution line 12). Each measuring device 38 is operable to measure an operating parameter of that associated portion of the power distribution network 10 to ensure that the network is functioning correctly. The operating parameter may be voltage, current, phase angle, or frequency of the electrical power provided to that portion of the network.

In embodiments, the monitoring device 22 is configured to monitor one or more of the measuring devices 38' associated with the portion of the power distribution network identified as a power island, to determine whether that part of the network remains stable. For example, if the conditions within the part identified as a power island fall within normal operating parameters, then the system may act to keep that power island operational. In other words, if the operating parameters are compared to a threshold (or the rates of change of the operating parameters are compared to a threshold) and no fault is detected, then the power island may be adjudged to be stable. Otherwise, the monitoring device 22 determines that an operating fault has occurred.

In embodiments, the system may operate to keep the power island supplied with electrical power until an operating fault has been detected, at which point a routine is initiated. In other embodiments, the system may operate to initiate a routine as soon as a power island is identified, regardless of whether it is deemed to be stable.

In the event of a shutdown routine being initiated, the monitoring device communicates to the one or more embedded generators 14 within the power island, to cause those generators 14 to disconnect from the power distribution network 10. Each generator 14 is connected to the distribution network 10 via a relay 24 or other control device. Each relay has an associated relay communication device 26, which is operable to communicate with the monitoring device 22, and is operable to actuate the relay 24 so as to connect or disconnect the generator 14 from the power distribution network 10. Communicating to the embedded generator 14 involves sending a communication to the relay communication device 24 associated with the generator's relay 24, so as to operate the relay 24 to disconnect the generator 14 from the distribution lines 12. The generators 14 may be disconnected simultaneously throughout the power island (i.e. all generators 14 connected to the portion of the network deemed to form a power island). Alternatively, the generators 14 may be disconnected in sequentially. The sequence may be determined by the power generation input of each generator to the network, or by any other means.

In embodiments, the system includes an operator station 40 communicatively connected to the monitoring device 22. The operator station 40 provides an operator display 42 and an input device 44 so that an operator can view and control aspects of the performance of the network.

In embodiments, the routine involves the monitoring system causing an error message to be displayed via the operator display 42 so that an operator is made aware of the error. In embodiments, the monitoring device 22 may provide additional warning of a routine being activated, which may include sounding an alarm, for example. An operator may input a response via the input device 44, which may include a command to be communicated via the monitoring device 22 to one or more embedded generators 14 that are electrically connected to the portion of the power distribution network 10 that has been determined to be a power island. This communication may cause those generators 14 to disconnect from the power distribution network 10, for example, by operating the associated relay(s) 24.

In embodiments, once the fault detected on the network has been resolved, the operator may determine that the embedded generator(s) 14 can be reconnected to the power distribution network 10. The operator may send a communication to each embedded generator 14 (i.e. to the relay communication device 26 associated with relay 24 by which the generator 14 is connected to the network) causing the relay 24 to reset to its connected state. In embodiments, this process of resetting the relay(s) 24 to reconnect the embedded generators 14 may be controlled by the monitoring system itself, triggered by readings from the measuring devices 38' showing that the network is operating normally once again (i.e. no faults are detected).

The monitoring device 22 stores in its memory 28 a computer program product comprising instructions which, when executed on its processor 32, cause the monitoring device 22 to carry out the steps as described above. In other words, in broad terms, the monitoring device 22 stores in its memory 28 data representing the connectivity of the power distribution network 10 including the status of the circuit breakers 16. The monitoring device, subsequently determines, in response to receiving a communication indicating the disconnection of a circuit breaker 16, using the data representing the connectivity of the distribution network 10, whether a portion of the power distribution network 10 has become electrically disconnected from a remainder of the power distribution network 10. If a power island has been detected in this way, the monitoring device 22 identifies the disconnected portion of the power distribution network, and may then initiate a routine as described (which may involve informing an operator via the operator display 40), or may involve allowing the power island to continue generating power self-sufficiently so long as it is adjudged to be stable.

While example embodiments of the invention are described herein, it should be understood that features of different embodiments may be combined with one another, in isolation from one another or in any combination, unless stated otherwise.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of detecting a power island in a power distribution network of the type comprising a plurality of distribution lines connecting consumers to electrical power supplied from one or more substations, a plurality of circuit breakers and/or switches each operable to connect and disconnect transmission of electrical power along an associated distribution line, each having a connected or disconnected status and each being associated with a communication device operable to communicate the connected or disconnected status of the circuit breaker and/or switch to a monitoring system, and one or more embedded generators each connected to a distribution line within the power distribution network so as to provide electrical power to the power distribution network, and a plurality of sensors configured to measure at least one of voltage, phase angle, current, and frequency to produce one or more measurements, the method comprising the steps of:

storing at the monitoring system data representing the connectivity of the distribution network including the connected or disconnected status of each circuit breaker and/or switch, receiving at the monitoring system a communication from the communication device that an associated circuit breaker and/or switch is disconnected, determining at the monitoring system, using the data representing the connectivity of the distribution network including the connected or disconnected status of the circuit breakers and/or switches, whether the disconnection of the circuit breaker and/or switch has resulted in a portion of the power distribution network being electrically disconnected from a remainder of the power distribution network that remains electrically connected to the one or more substations, identifying the disconnected portion of the power distribution network as a power island within the power distribution network, and upon identifying that the power island has been formed,
determining whether one or more embedded generators are located within the disconnected portion of the power distribution network, determining relevant sensors of the sensors to measure at least one of voltage, phase angle, current, and frequency, using the measurements of the relevant sensors to determine whether the disconnected portion of the power distribution network is supplied with electrical power from the one or more embedded generators, and, if the portion of the power distribution network is supplied with electrical power, keeping the power island supplied with electrical power until an operating fault is detected.

2. The method according to claim 1, wherein the step of receiving a communication from a communication device that an associated circuit breaker and/or switch is disconnected further includes updating the stored data representing the connectivity of the distribution network to reflect that the distribution line associated with the circuit breaker and/or switch is electrically disconnected.

3. The method according to claim 1, further comprising measuring an operating parameter of that portion of the power distribution network and comparing that measured parameter to a threshold, or comparing the rate of change of that parameter to a threshold to determine whether an operating fault has occurred in the portion of the power distribution network that has been determined to be a power island, wherein the operating parameter is one of voltage, current, phase angle, or frequency of the electrical power provided to that portion of the network.

4. The method according to claim 3, wherein measuring an operating parameter includes monitoring one or more of the operating parameters of that portion of the power distribution network by comparing the or each value to a threshold, or comparing the rate of change of that parameter to a threshold, and determining an operating fault when one or more of the operating parameters exceeds its associated threshold, in which following the detection of a power island, and in response to determining an operating fault, initiating a routine.

5. The method according to claim 1, further comprising the step of:

having determined that a power island has been formed, initiating a routine.

6. The method according to claim 5, wherein the routine includes disconnecting one or more embedded generators that are electrically connected to the portion of the power distribution network that has been determined to be a power island.

7. The method according to claim 6, wherein a plurality of embedded generators are electrically connected to the power island, and wherein disconnecting the embedded generators includes operating the relays or other control devices associated with each of the plurality of embedded generators, either substantially simultaneously or sequentially, to disconnected them from the distribution lines of the power island.

8. A system for detecting a power island in a power distribution network of the type comprising a plurality of distribution lines connecting consumers to electrical power supplied from one or more substations, a plurality of circuit breakers and/or switches each operable to connect and disconnect transmission of electrical power along an associated distribution line and each having a connected or disconnected status, and one or more embedded generators each connected to a distribution line within the power distribution network so as to provide electrical power to the power distribution network, and a plurality of sensors configured to measure at least one of voltage, phase angle, current, and frequency to produce one or more measurements, the system comprising:

a monitoring system configured to store data representing the connectivity of the power distribution network including the connected or disconnected status of each circuit breaker and/or switch, and configured to receive communications including communications indicating the connected or disconnected status of the circuit breakers and/or switches, and a plurality of communication devices each associated with one or more circuit breakers and/or switches, the communication device being operable to communicate the connected or disconnected status of its associated circuit breaker(s) and/or switch(es) to the monitoring system, the monitoring system further configured to receive a communication indicative of a disconnection of a circuit breaker and/or switch and configured to respond to the communication indicative of the disconnection by using the stored data representing the connectivity of the distribution network, the monitoring system, when responding to the communication indicative of the disconnection, further configured to use the stored data to determine whether a portion of the power distribution network that has become electrically disconnected from the remainder of the power distribution network that remains electrically connected to the one or more substations, and to identify the disconnected portion of the power distribution network as a power island within the power distribution network, and wherein the system is further configured such that, upon identifying that the power island has been formed, determining whether one or more embedded generators are located within the disconnected portion of the power distribution network, determining relevant sensors of the sensors to measure at least one of voltage, phase angle, current, and frequency, using the measurements of the relevant sensors to determine whether the disconnected portion of the power distribution network is supplied with electrical power from the one or more embedded generators, and if the portion of the power distribution network is supplied with electrical power, keeping the power island supplied with electrical power until an operating fault is detected.

9. The system according to claim 8, wherein the monitoring system is configured to update the stored data representing the connectivity of the distribution network in response to receiving a communication from a communication device that an associated circuit breaker and/or switch is disconnected, to reflect that the distribution line associated with the circuit breaker and/or switch is electrically disconnected.

10. The system according to claim 8, further including a plurality of measuring devices each connected to a respective associated portion of the power distribution network, each being operable to measure an operating parameter of that associated portion of the power distribution network, wherein the operating parameter is one of voltage, current, phase angle, or frequency of the electrical power provided to that portion of the network, and wherein the system is configured to monitor one or more of the measuring devices associated with the portion of the power distribution network identified as a power island, such that the operating parameter(s) is compared to a threshold or the rates of change of the operating parameter(s) is compared to a threshold, to determine whether an operating fault has occurred in the portion of the power distribution network that has been determined to be a power island, and to initiate a routine in response to determining that an operating fault has occurred in that portion of the power distribution network.

11. The system according to claim 8, wherein the monitoring system is configured to initiate a routine in response to a power island being identified.

12. The system according to claim 11, wherein the monitoring system is configured, in the event of the routine being initiated, to communicate to one or more embedded generators that are electrically connected to the portion of the power distribution network that has been determined to be a power island so as to cause those generators to disconnect from the power distribution network.

13. The system according to claim 11 further comprising an operator station providing an operator display and an input device, wherein the routine includes the monitoring system causing an error message to be displayed via the operator display, and in response to receiving an input from an operator via the input device, communicating to one or more embedded generators that are electrically connected to the portion of the power distribution network that has been determined to be a power island so as to cause those generators to disconnect from the power distribution network.

14. A monitoring system comprising: a monitoring device having a memory, a processor, and a communication device configured to send and receive data, the monitoring device being configured: to store, in the memory, data representing the connectivity of a power distribution network including a connected or disconnected status of a plurality of circuit breakers and/or switches on the power distribution network, and to determine, in response to receiving a communication indicating a disconnection of a circuit breaker and/or switch, using the stored data representing the connectivity of the distribution network, whether a portion of the power distribution network has become electrically disconnected from a remainder of the power distribution network, and to identify the disconnected portion of the power distribution network as a power island within the power distribution network, and wherein the system is further configured such that, upon identifying that the power island has been formed, determining whether one or more embedded generators are located within the disconnected portion of the power distribution network, determining relevant sensors of the sensors to measure at least one of voltage, phase angle, current, and frequency, using the measurements of the relevant sensors to determine whether the disconnected portion of the power distribution network is supplied with electrical power from the one or more embedded generators, if the portion of the power distribution network is supplied with electrical power, keeping the power island supplied with electrical power until an operating fault is detected.

15. A method comprising:

storing in a memory data representing the connectivity of a power distribution network including a connected or disconnected status of a plurality of circuit breakers and/or switches on the power distribution network, wherein the power distribution network comprises a plurality of distribution lines connecting consumers to electrical power supplied from one or more substations, the plurality of circuit breakers and/or switches each operable to connect and disconnect transmission of electrical power along an associated distribution line, each being associated with a communication device operable to communicate the connected or disconnected status of the circuit breaker and/or switch to a monitoring system, and one or more embedded generators each connected to a distribution line within the power distribution network so as to provide electrical power to the power distribution network, and a plurality of sensors configured to measure at least one of voltage, phase angle, current, and frequency to produce one or more measurements, determining, in response to receiving a communication indicating a disconnection of a circuit breaker and/or switch, using the data representing the connectivity of the distribution network, whether a portion of the power distribution network has become electrically disconnected from a remainder of the power distribution network, identifying the disconnected portion of the power distribution network as a power island within the power distribution network, and upon identifying that the power island has been formed, determining whether one or more embedded generators are located within the disconnected portion of the power distribution network, determining relevant sensors of the sensors to measure at least one of voltage, phase angle, current, and frequency, using the measurements of the relevant sensors to determine whether the disconnected portion of the power distribution network is supplied with electrical power from the one or more embedded generators, and, if the portion of the power distribution network is supplied with electrical power, keeping the power island supplied with electrical power until an operating fault is detected.

16. The method according to claim 2, further comprising measuring an operating parameter of that portion of the power distribution network and comparing that measured parameter to a threshold, or comparing the rate of change of that parameter to a threshold to determine whether an operating fault has occurred in the portion of the power distribution network that has been determined to be a power island, wherein the operating parameter is one of voltage, current, phase angle, or frequency of the electrical power provided to that portion of the network.

17. The method according to claim 4, wherein the routine includes disconnecting one or more embedded generators that are electrically connected to the portion of the power distribution network that has been determined to be a power island.

18. The system according to claim 9, wherein the monitoring system is configured to initiate a routine in response to a power island being identified.

19. The system according to claim 10, wherein the monitoring system is configured, in the event of the routine being initiated, to communicate to one or more embedded generators that are electrically connected to the portion of the power distribution network that has been determined to be a power island so as to cause those generators to disconnect from the power distribution network.

20. The system according to claim 12 further comprising an operator station providing an operator display and an input device, wherein the routine includes the monitoring system causing an error message to be displayed via the operator display, and in response to receiving an input from an operator via the input device, communicating to one or more embedded generators that are electrically connected to the portion of the power distribution network that has been determined to be a power island so as to cause those generators to disconnect from the power distribution network.

\* \* \* \* \*